(12) United States Patent
Horowitz et al.

(10) Patent No.: US 9,942,262 B1
(45) Date of Patent: Apr. 10, 2018

(54) CYBER-PHYSICAL SYSTEM DEFENSE

(71) Applicant: University of Virginia Patent Foundation, Charlottesville, VA (US)

(72) Inventors: Barry Horowitz, Crozet, VA (US); Joseph Vince Pulido, Washington, DC (US); Rick A. Jones, Charlottesville, VA (US); Edward C. Suhler, Earlysville, VA (US); Ronald Dean Williams, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 58 days.

(21) Appl. No.: 14/660,278

(22) Filed: Mar. 17, 2015

Related U.S. Application Data

(60) Provisional application No. 61/955,669, filed on Mar. 19, 2014, provisional application No. 62/075,179, filed on Nov. 4, 2014.

(51) Int. Cl.
*H01L 29/06* (2006.01)
*H04L 29/06* (2006.01)
*H04L 29/08* (2006.01)
*G08B 21/18* (2006.01)
*G01S 19/13* (2010.01)

(52) U.S. Cl.
CPC .......... *H04L 63/145* (2013.01); *G01S 19/13* (2013.01); *G08B 21/182* (2013.01); *H04L 67/12* (2013.01)

(58) Field of Classification Search
CPC ....... H04L 63/145; H04L 67/12; G01S 19/13; G08B 21/182
See application file for complete search history.

(56) References Cited

U.S. PATENT DOCUMENTS

| | | | |
|---|---|---|---|
| 7,359,883 B2 | 4/2008 | Namba et al. |
| 7,389,354 B1 | 6/2008 | Sitaraman et al. |
| 7,448,067 B2 | 11/2008 | Yadav |
| 7,757,295 B1 | 7/2010 | Hadaaegh |
| 7,845,010 B2 | 11/2010 | Fujimoto et al. |
| 8,271,642 B1 | 9/2012 | Sankararaman et al. |
| 8,286,250 B1 | 10/2012 | Le et al. |
| 8,321,683 B2 | 11/2012 | Hsu |
| 8,365,291 B1 | 1/2013 | Le et al. |
| 8,413,211 B2 | 4/2013 | Tokutani et al. |

(Continued)

FOREIGN PATENT DOCUMENTS

| | | |
|---|---|---|
| GB | 2406746 B | 6/2006 |
| WO | WO2009059377 A1 | 5/2009 |

(Continued)

OTHER PUBLICATIONS

"2012 Threats Predictions", McAfee Labs, (2011), 12 pgs.

(Continued)

*Primary Examiner* — Don Zhao
(74) *Attorney, Agent, or Firm* — Schwegman Lundberg & Woessner, P.A.

(57) ABSTRACT

System and techniques for cyber-physical system defense are described herein. Sensor disagreements between a plurality of sensors over time can be sampled. Cluster analysis on the sampled sensor disagreements can be performed. A deviation indication can be provided in response to the cluster analysis resulting in disagreement density beyond a threshold.

36 Claims, 5 Drawing Sheets

(56) References Cited

U.S. PATENT DOCUMENTS

| | | | |
|---|---|---|---|
| 8,468,597 B1 | 6/2013 | Warner et al. | |
| 8,489,892 B2 | 7/2013 | Onno et al. | |
| 8,495,735 B1 | 7/2013 | Warner et al. | |
| 8,505,102 B1 | 8/2013 | Cannings et al. | |
| 8,549,628 B2 | 10/2013 | Vasireddy et al. | |
| 8,621,553 B2 | 12/2013 | Syed et al. | |
| 8,732,296 B1 | 5/2014 | Thomas et al. | |
| 8,732,837 B1 | 5/2014 | Miller et al. | |
| 8,994,556 B2* | 3/2015 | Lundy | G08C 17/02 340/539.11 |
| 9,697,355 B1 | 7/2017 | Park et al. | |
| 2003/0139909 A1* | 7/2003 | Ozawa | G21C 17/06 702/183 |
| 2005/0076236 A1 | 4/2005 | Stephenson | |
| 2007/0087756 A1* | 4/2007 | Hoffberg | G06Q 10/0631 455/450 |
| 2007/0097998 A1 | 5/2007 | Raikar | |
| 2007/0156338 A1* | 7/2007 | Coatantiec | G01S 19/23 701/472 |
| 2009/0077004 A1 | 3/2009 | Anglin et al. | |
| 2009/0248693 A1 | 10/2009 | Sagar et al. | |
| 2009/0276771 A1 | 11/2009 | Nickolov et al. | |
| 2009/0300711 A1 | 12/2009 | Tokutani et al. | |
| 2010/0124886 A1* | 5/2010 | Fordham | H04B 17/382 455/67.11 |
| 2010/0217850 A1 | 8/2010 | Ferris | |
| 2010/0251328 A1 | 9/2010 | Syed et al. | |
| 2010/0317420 A1* | 12/2010 | Hoffberg | G06Q 30/0207 463/1 |
| 2011/0167474 A1 | 7/2011 | Sinha et al. | |
| 2011/0295727 A1 | 12/2011 | Ferris et al. | |
| 2012/0026898 A1* | 2/2012 | Sen | H04L 43/04 370/252 |
| 2012/0026938 A1* | 2/2012 | Pandey | H04L 43/065 370/328 |
| 2012/0042361 A1 | 2/2012 | Wong et al. | |
| 2012/0063641 A1* | 3/2012 | Venkatesh | G06K 9/00771 382/103 |
| 2012/0166582 A1 | 6/2012 | Binder | |
| 2012/0303808 A1 | 11/2012 | Xie | |
| 2012/0311708 A1 | 12/2012 | Agarwal et al. | |
| 2013/0328697 A1* | 12/2013 | Lundy | G08C 17/02 340/870.16 |
| 2014/0310423 A1 | 10/2014 | Lim | |
| 2014/0350893 A1* | 11/2014 | de Antoni | G01D 1/16 702/189 |
| 2014/0361905 A1* | 12/2014 | Sadasivam | G08C 17/02 340/870.01 |
| 2014/0379673 A1 | 12/2014 | Lim | |
| 2015/0195307 A1 | 7/2015 | Lim | |
| 2015/0271201 A1* | 9/2015 | Ruvio | H04L 63/1408 726/23 |
| 2015/0341981 A1* | 11/2015 | Gallo | H04W 84/18 702/188 |
| 2015/0378574 A1* | 12/2015 | Gallo | G06F 3/04842 707/736 |
| 2015/0379765 A1* | 12/2015 | Gallo | G06T 17/05 340/525 |
| 2015/0379853 A1* | 12/2015 | Gallo | G08B 21/12 340/600 |
| 2015/0382084 A1* | 12/2015 | Gallo | H04Q 9/00 340/870.01 |
| 2016/0077202 A1* | 3/2016 | Hirvonen | G01S 19/13 342/25 R |

FOREIGN PATENT DOCUMENTS

| | | |
|---|---|---|
| WO | WO-2009111799 A3 | 9/2009 |
| WO | WO-2012085908 A3 | 6/2012 |
| WO | WO-2013101215 A1 | 7/2013 |
| WO | WO-2013126258 A1 | 10/2013 |
| WO | WO-2013158336 A1 | 10/2013 |

OTHER PUBLICATIONS

Amin, S., et al., "Cyber Security of Water SCADA Systems—Part II: Attack Detection Using Enhanced Hydrodunamic Models", Control Systems Technology, IEEE Transactions on,vol. pp., No. 99, (2012), 1-15.

Amin, S., et al., "Cyber Security of Water SCADA Systems: Part 1 Analysis and Experimentation of Stealthy Deception Attacks", Control Systems Technology, IEEE Transactions on,vol. pp., No. 99, (2012), 8 pgs.

Babineau, Guy L., et al., "A system-aware cyber security method for shipboard control systems with a method described to evaluate cyber security solutions", Homeland Security (HST), 2012 IEEE Conference on Technologies, (Nov. 2012), 99-104.

Baheti, Radhakisan, et al., "Cyber-physical Systems", The Impact of Control Technology, (2011), 6 pgs.

Blanke, Mogens, et al., "Fault diagnosis of continuous-variable systems", Chap. 6 from Diagnosis and Fault-Tolerant Control Springer-Verlag Berlin Heidelberg, (2006), 110 pgs.

Cardenas, Alvaro A., "Attacks Against Process Control Systems: Risk Assessment, Detection, and Response", ASIACCS '11 Proceedings of the 6th ACM Symposium on Information, Computer and Communications Security, (2011), 12 pgs.

Cardenas, Alvaro A., et al., "Research Challenges for the Security of Control Systems", 3rd USENIX workshop on Hot Topics in Security, (2008), 6 pgs.

Cha, Sung-Hyuk, "Comprehensive Survey on Distance/Similarity Measures between Probability Desnity Functions", International Journal of Mathematical Models and Methods in Applied Sciences, Issue 4, vol. 1 (2007), 300-307.

Gertler, Janos J., "Survey of model-based failure detection and isolation in complex plants", (Dec. 1998), 3-11.

Giray, S., "Anatomy of Umanned Aerial Vehicle Hijacking with Signal Spoofing", IEEE—Recent Advances in Space Technologies (RAST), 2013 6th International Conference, (Jun. 2013), 795-800.

Gregg, Donna M., et al., "Assessing and quantifying denial of service attacks", IEEE—Military Communications Conference, 2001. MILCOM 2001. Communications for Network-Centric Operations: Creating the Information Force. (vol. 1), (2001), 76-80.

Hartmann, Kim, et al., "The vulnerability of UAVs to cyber attacks—An approach to the risk assessment", Cyber Conflict (CyCon), 5th International Conference, (2013), 23 pgs.

Hu, Hui, et al., "The Study on Position Error Correction of C/A Code GPS Receiver", IEEE International Symposium—Knowledge Acquisition and Modeling Workshop, 2008. KAM Workshop 2008., (Dec. 2008), 719-722.

Jones, R., et al., "System-Aware Cyber Security", Information Technology: New Generations (ITNG), 2011 Eighth International Conference, (Apr. 2011), 914-917.

Jones, R.A., et al., "System-Aware Security for Nuclear Power Systems", Technologies for Homeland Security (HST), 2011 IEEE International Conference, (Nov. 2011), 224-229.

Kim, Alan, et al., "Cyber Attack Vulnerabilities Analysis for Unmanned Aerial Vehicles", American Institute of Aeronautics and Astronautics, (2012), 30 pgs.

Kosut, O., et al., "On malicious data attacks on power system estate estimation", IEEE—Universities Power Engineering Conference (UPEC), 2010 45th International, (2010), 1-6.

Krebs, Brian, "Cyber Incedent Blamed for Nuclear Power Plant Shutdown", Washington Post, (Jun. 5, 2008), 2 pgs.

Kwon, Cheolhyeon, et al., "Security Analysis for Cyber-Physical Systems against Stealthy Detection Attacks", IEEE American Control Conference, 2013, Washington, DC, (2013), 3344-3349.

Langner, Ralph, "Stuxnet: Dissecting a Cyberwarfare Weapon", IEEE Security & Privacy, vol. 9, No. 3, (May/Jun. 2011), 49-51.

Littlewood, Bev, et al., "Redundancy and Diversity in Security", Lecture Notes in Computer Science, vol. 3193, (2004), 16 pgs.

Mo, Yilin, et al., "False data injection attacks in control systems", Preprints of the First Workshop on Secure Control Systems, (2010).

Rahman, Ashfaqur, et al., "False data injection attacks with incomplete information against smart power grids", IEEE—Global Communications Conference (GLOBECOMJ), (2012), 6 pgs.

(56) References Cited

OTHER PUBLICATIONS

Ramanathan, Nithya, et al., "Rapid Deployment with Confidence: Calibration and Fault Detection in Environmental Sensor Networks", (Jul. 4, 2006), 14 pgs.

Robinson, Rejimol R., et al., "Evaluation of mitigation methods for distributed denial of service attacks", Industrial Electronics and Applications (ICIEA), 2012 7th IEEE Conference, (Jul. 2012), 713-718.

Rrushi, Julian, "Composite intrusion Detection in Process Control Networks", Universita Degli Studi Di Milano, (2009), 205 pgs.

Sharma, A., et al., "On the Prevalence of Sensor Faults in Real-World Deployments", Sensor, Mesh and Ad Hoc Communications and Networks, 2007. Secon '07. 4th Annual IEEE Communications Society Conference, (Jun. 2007), 213-222.

Sohne, W., "Integrated INS/GPS system for high precision navigation applications", IEEE—Position Location and Navigation Symposium, (Apr. 1994), 310-313.

Tolle, Gilman, et al., "A macroscope in the Redwoods", Proceedings of the 2nd International conference on Embedded networked sensor systems, (2005), 13 pgs.

Xi, Ouyang, et al., "A Novel Framework of Defense System Against DoS Attacks in Wireless Sensor", Wireless Communications, Networking and Mobile Computing (WiCOM), 2011 7th International Conference, (Sep. 2011), 1-5.

"U.S. Appl. No. 14/660,261, Restriction Requirement dated Sep. 21, 2016", 6 pgs.

"System-Aware Cyber Security", A Dissertation—Dec. 2012, 130 pgs.

Bayuk, J.L., et al., "An architectural systems engineering methodology for addressing cyber security", Systems Engineering 14, (2011), 294-304.

Jones, Rick A., "A System-Aware Cyber Security Architecture", Systems Engineering vol. 15, (Feb. 13, 2012), 225-240.

Pulido, J. Vince, "A Method for the Detection and Diagnosis of Stealthy False Data Injection Attacks in Cyber-Physical Systems", A Thesis Document—May 2014, 73 pgs.

\* cited by examiner

CYBER-PHYSICAL SYSTEM DEFENSE

CLAIM OF PRIORITY

This patent application claims the benefit of priority, under 35 U.S.C. § 119, to U.S. Provisional Application Ser. No. 61/955,669, titled "CLOUD BASED SYSTEM AWARE CYBER SECURITY AND RELATED METHODS THEREOF" and filed on Mar. 19, 2014, and also claims priority to U.S. Provisional Application Ser. No. 62/075,179, titled "SYSTEM AWARE CYBER SECURITY AND RELATED METHODS THEREOF" and filed on Nov. 4, 2015, the entirety of all are hereby incorporated by reference herein.

TECHNICAL FIELD

Embodiments described herein generally relate to system security and more specifically to cyber-physical system defense.

BACKGROUND

Cyber-physical systems combine computational, communication, sensory and control capabilities to monitor and regulate physical domain processes. Cyber-physical systems broadly focus on monitoring and controlling a physical process, and may include capabilities to: sense the physical world (e.g., the position of a valve controlling a tank filling process); make decisions (e.g., whether it is necessary to open or close the valve); and perform actions in physical world (e.g. open or close valve to maintain tank fluid level). Cyber-physical systems are becoming increasingly prevalent, filing roles in the civilian (e.g., power grid, public utility services, financial infrastructure, etc.) and defense (e.g., search and rescue missions and command, control, and conquer (C3) systems) spaces.

Cyber-physical systems are becoming increasingly accessible to attackers via increased network access to communication with control rooms, command and control stations, other computer based systems and networks such as the Internet. Examples of cyber-physical systems include transportation networks, unmanned aerial vehicles (UAV's), nuclear power generation, electric power distribution networks, water and gas distribution networks, and advanced communication systems. Current technology has often introduced the capability of integrating information from numerous instrumentation and control systems and transmitting the information to operations personnel in a timely manner.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Due to the increased vulnerability of cyber-physical systems given greater remote access as well as the reliance of these automated systems on control systems without human input, security is an important consideration. Traditionally, security is implemented via perimeter defense—such as such as firewalls, intrusion detection mechanisms, anti-viral signature software, encryption, and advanced user authentication—designed to prevent an attacker from gaining control of the cyber-physical system. While the application of perimeter security technologies has been used to address attacks, the rate of successful attacks against critical infrastructures continues to be increasingly problematic. Furthermore, the trend in adversarial attacks is moving toward well-formed coordinated multi-vector attacks that compromise the system in such a way that detection and identification is challenging for perimeter security solutions. Furthermore, an asymmetrical conflict arises where defending against attacks is expensive while actually performing attacks is becomingly increasingly inexpensive. That is, the attacker may take time to probe a defense perimeter, identify a weak point, and exploit it while the defender must spend inordinate resources to identify and fix weak points ahead of time while being giving very little time to address an attack on an overlooked weak point.

To address the problem of cyber-physical system defense given above, the behavior of multiple redundant (in both type and number) sensors can be used to produce a robust platform for the cyber-physical system control. Further, disagreements between the sensors can be analyzed to identify periods in which an attack is likely, such as when noted disagreements cluster together. Such a cluster analysis addresses the practical reality that disparate sensors may not agree at all times, however, are likely to reflect a pattern of disagreement during normative (e.g., normal and not under attack) operations. Further, to address whether or not a single disagreement has occurred between two disparate sensors, the data from these sensors can be statistically analyzed to determine whether it deviates from a known probability distribution (e.g., a random normal distribution). Moreover, individual sensor disagreements can be analyzed via a logical pairing structure (e.g., a decision tree) to identify the component suspected of being compromised in an attack. By using these techniques, a cyber-physical system includes robust and ongoing defense of attacks that may have breached other defense mechanisms, such as perimeter security mechanisms.

Figure 1:
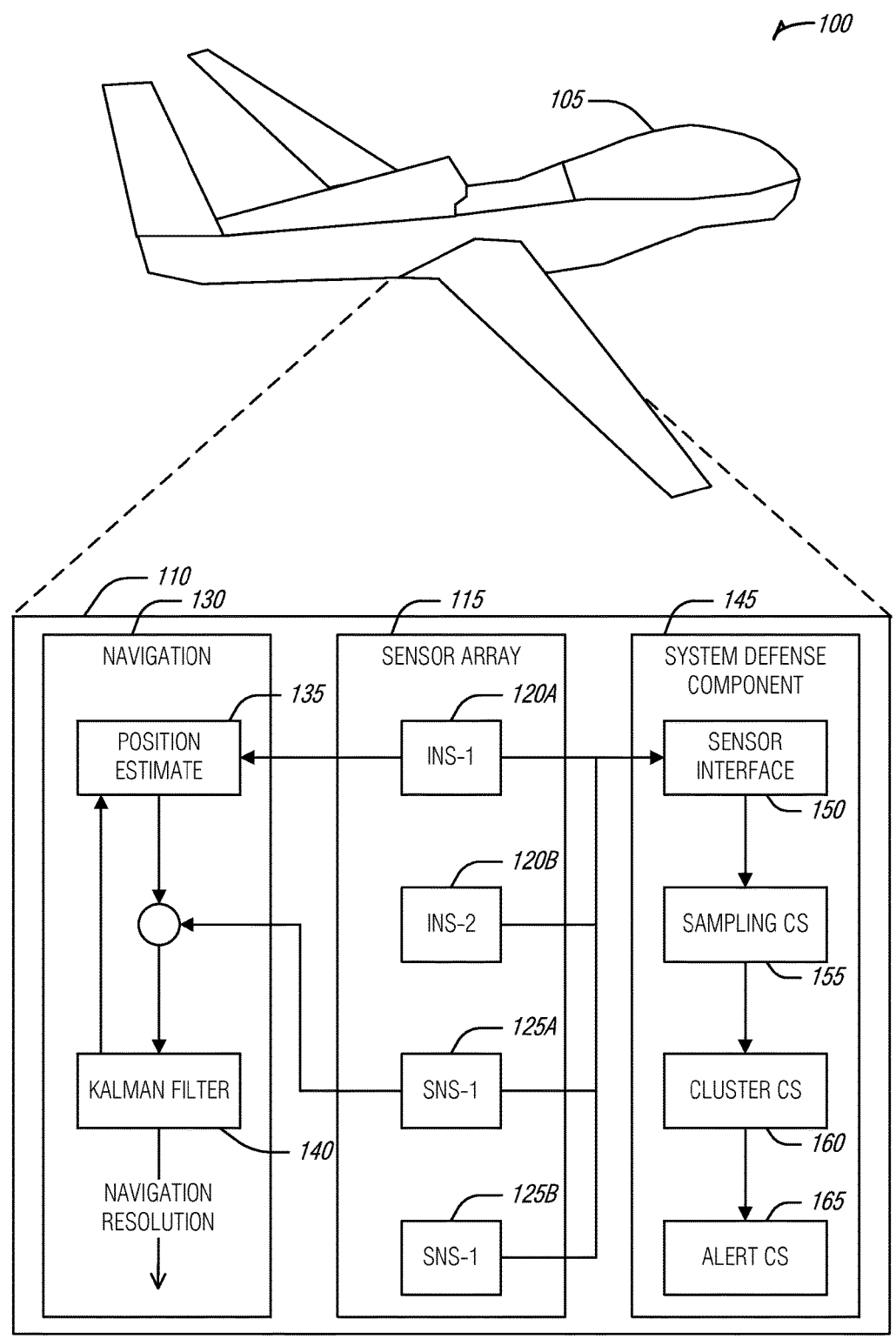
FIG. 1 is a block diagram of an example of an environment including a system for cyber-physical defense, according to an embodiment.

FIG. 1 is a block diagram of an example of an environment 100 including a system 145 for cyber-physical defense, according to an embodiment. The following discussion generally uses the example of a simplified UAV navigation control system. However, the discussed techniques are applicable to other cyber-physical control systems as long as a known probability distribution between sensor readings can be established.

The environment 100 includes a UAV 105 with a control system 110. The control system 110 can include a navigation component 130, a sensor array 115, and a system defense component 145. The navigation component 103 can include a position estimate module 135 that takes an inertial navigation system output and feedback from a Kalman filter 140 as inputs and produces a navigation signal that is combined with a satellite navigation system (e.g., global position system, GLONASS, Galileo, Beidou, etc.) output and used in the Kalman filter 140 to produce navigation resolution for the UAV 105. The navigation resolution can be used to determined which actuators of the UAV to manipulate and how they are to be manipulated to pilot the IAV 105. The sensor array 115 can include a plurality of sensors, such as inertial navigation sensors INS-1 120A and INS-2 120B and satellite navigation system sensors SNS-1 125A and SNS-2 125B. In example, the plurality of sensors in the sensor array 115 can include a number of subsets, such as subsets based on homogeneous type (e.g., inertial navigation system as a first type and satellite navigation system as a second type).

The system defense component 145 can include a sensor interface 150. The sensor interface 150 includes hardware to communicatively receive or retrieve data from the sensors 120-125 in the sensor array 115. The sensor interface 150 also includes hardware to provide the sensor data to other components of the system defense component, such as the sampling circuit set 155, the cluster circuit set 160, or the alert circuit set 165.

The sampling circuit set 155 can sample sensor disagreements between the plurality of sensors over time. In an example, to sample sensor disagreements between the plurality of sensors over time can include obtaining a first data set for a first sensor set, obtain a second data set for a second sensor set determine a disagreement between the first data set and the second data set. Such result comparisons for sensor disagreements can be performed in a number of ways. For example, the result of a first sensor can be directly compared with the result of a second sensor and when the results do not match, either exactly or within a threshold, a disagreement is registered. However, sensor diversity in sourcing (e.g., who makes the sensor) and operation (e.g., what hardware is used) can make it more difficult to attack. This diversity may include diverse operating characteristics, making direct result comparison a less reliable indication of actual sensor disagreement. This issue may be compounded when disagreements between different types of sensors are sought.

In an example, to address the direct comparison issues mentioned above, determining the disagreement between the first data set and the second data set can include combining the first data set with the second data set to create a measurement data set, calculating a set of residuals for the measurement data set, and determining that a mean for the residuals is beyond a threshold in relation to an expected mean for the residuals. Thus, a statistical model is applied to the differences between the two data sets to ascertain whether they are behaving as they should. Below is a discussion of the ability to use the mean of the residuals to ascertain undue influence in one or another sensor.

First, the state of the UAV 105 navigation can be modeled for multiple satellite navigation system sensors 125 and inertial navigation system sensors 125 as a linear time-invariant stochastic system with Gaussian noise (which accounts for modeling errors, uncertainties, or system external perturbations). Such as system can be expressed in the manner illustrated below:

Let x be the state of the UAV 105, where:
- $x_1$:=x-axis coordinate position
- $x_2$:=x-axis component of velocity
- $x_3$:=y-axis coordinate position
- $x_4$:=y-axis component of velocity Inertial Navigation System Components (M Units):

$$x_a^{(1)}(k+1)=Ax_a(k)+Bu_a(k)+B_c a_c(k)+\partial Tw^{(1)}(k)$$

$$x_a^{(2)}(k+1)=Ax_a(k)+Bu_a(k)+B_c a_c(k)+\partial Tw^{(2)}(k)$$

$$x_a^{(M)}(k+1)=Ax_a(k)+Bu_a(k)+B_c a_c(k)+\partial Tw^{(M)}(k)$$

Satellite Navigation System Components (N Units):

$$z_a^{(1)}(k)=C^1 x_a(k)+B_o a_o(k)+v^{(1)}(k)$$

$$z_a^{(2)}(k)=C^1 x_a(k)+B_o a_o(k)+v^{(2)}(k)$$

$$z_a^{(N)}(k)=C^1 x_a(k)+B_o a_o(k)+v^{(N)}(k)$$

where $x_a(k) \in \Re^l$, $u(k) \in \Re^p$, $z_a(k) \in \Re^t$ are the system state, inputs of the inertial navigations system units, and the measurement of the satellite navigation units, and where $w^j(k) \in \Re^q$, $v^i(k) \in \Re^t$ are process and measurement noise. The w(k) and v(k) components are Gaussian white noise of the inertial navigation system and satellite navigation system measurements respectively, with constant covariance matrices Q and R. Further, let $$A = \begin{bmatrix} 1 & T_s & 0 & 0 \\ 0 & 1 & 0 & 0 \\ 0 & 0 & 1 & T_s \\ 0 & 0 & 0 & 1 \end{bmatrix}$$

$$B = \begin{bmatrix} \frac{T_s^2}{2} & 0 \\ T_s & 0 \\ 0 & \frac{T_s^2}{2} \\ 0 & T_s \end{bmatrix}$$

$$C = \begin{bmatrix} 1 & 0 & 0 & 0 \\ 0 & 0 & 1 & 0 \end{bmatrix}$$

$$\partial T = \begin{bmatrix} \frac{T_s^2}{2} \\ T_s \\ \frac{T_s^2}{2} \\ T_s \end{bmatrix}$$

where $B_o$, $B_c$ are the attack matrices and $a_o(k)$, $a_c(k)$ are persistent, linear deception attacks against the satellite navigation systems and inertial navigation systems at time k respectively.

Given this model of the system, similarity analysis between these components can be carried out as with the following component specific similarity analyses.

Similarity between two inertial navigation system components can look a velocity or acceleration residuals between the two components. Selection of particular sensor outputs for comparison, rather than all components, can alleviate identified senor issues, such as compounding drift in inertial navigation sensors. The residual of the acceleration measurement for the two inertial navigation system components is:

$$r_1(k)=(Bu_a^{(1)}(k)+B_c a_c^{(1)}+\partial Tw^{(1)}(k))-(Bu_a^{(2)}(k)+B_c a_c^{(2)}+\partial Tw^{(2)}(k))=B(u_a^{(1)}(k)-u_a^{(2)}(k))+\partial T(w^{(1)}(k)-w^{(2)}(k))+a_c(k)$$

where $a_c(k)=B(a_c^{(1)}(k)-a_c^{(2)}(k))$. Given this, because $w^{(i)}(k)$ is a zero-mean Gaussian, and because $u_a^{(1)}(k)=u_a^{(2)}(k)$, we have:

$$N(0,\Theta T(Q^{(1)}+Q^{(2)})\Theta T)\sim \Theta T(w^{(1)}(k)-w^{(2)}(k))$$

If $a_c(k)\neq 0$, then $r_1(k)$ loses its non-zero Gaussian characteristic. Thus, a valid test for sensor deviation (e.g., based on a security intrusion) is to test the non-zero mean normality of the residuals, which can be performed with the compound scalar test. Since r(k) is a bivariate standard normally distributed random variable, let $$\mathbb{R}_1(k)=r_1(k)^T((C^T\Theta TC)\Sigma_{r_1}^{-1}(C^T\Theta TC))r_1(k)$$

be the sum of squares of the residual with two degrees of freedom between the two inertial navigation system acceleration measurements with covariance matrix $$\Sigma_{r_1}=Q^{(1)}+Q^{(2)}$$

With the application of the compound scalar test to assess the normality of the residuals, the hypothesis test becomes:

$$H_0: X(\mathbb{R}_1(k))<\text{threshold}$$

$$H_1: X(\mathbb{R}_1(k))>\text{threshold}$$

where $H_1$ signifies a disagreement at time k. In an example, the threshold is 0.99.

As demonstrated above, the differences between the two sensor readings, at a point in time—e.g., within a tolerance threshold such that two readings are considered at the same point in time, the tolerance threshold providing sufficient resolution to produce a meaningful result given the application—can be tested for conformance to a probability distribution to determine disagreement between the sensors. Although the specifics of some terms vary, the application of the above technique operates in the same way for disagreement (e.g., similarity) testing of satellite navigation system sensors and between inertial navigation system sensors and satellite navigation system sensors because the residuals are Gaussian distributed random variables.

In an example, between two satellite navigation systems, the residuals of the satellite navigation system measurements (represented above as $z_a^{(N)}$) can be used. For example, for two satellite navigation sensors 1 and 2, the residual is $$r_2(k)=z_a^{(1)}(k)-z_a^{(2)}(k)=(Cx_a(k)+B_oa_o^{(1)}(k)+v^{(1)}(k))-(Cx_a(k)+B_oa_o^{(1)}(k)+v^{(1)}(k))=(v^{(1)}(k)-v^{(2)}(k))+\alpha_0(k)$$

where $\alpha_0(k)=B_0(a_0^{(1)}(k)-a_0^{(2)}(k))$. Because $v^{(i)}$ is a zero-mean Gaussian random variable, we have:

$$N(0,R^{(1)}+R^{(2)})\sim(v^{(1)}(k)-v^{(2)}(k))$$

Again, if $\alpha_0(k)\neq 0$, then $r_1$ loses its non-zero Gaussian characteristics. Thus, the scalar compound test can be used to assess a deviation. Let X be the sum of squares of the residual:

$$\mathbb{R}_2(k)=r_2(k)^T(\Sigma_{r_2}^{-1})r_2(k)$$

$$\Sigma_{r_2}=R^{(1)}+R^{(2)}$$

and the compound scalar test hypothesis becomes:

$$H_0: X(\mathbb{R}_2(k))<\text{threshold}$$

$$H_1: X(\mathbb{R}_2(k))>\text{threshold}$$

where $H_1$ signifies a disagreement at time k. In an example, the threshold is 0.99.

In an example, between a satellite navigation system sensor and an inertial navigation system sensor, the position residuals (respectively represented above as $z_a^{(N)}$ and $x_a^{(M)}$) can be used. For example, the residual of the inertial navigation system sensor and the satellite navigation sensor is:

$$r_3(k)=x_a^{(1)}(k)-z_a^{(1)}(k)=CAx_a^{(1)}(k-1)+CBu(k-1)0Cx_a(k)+[B_0a_0^{(1)}(k)-B_ca_c^{(1)}(k)]+[C\Theta Tw^{(1)}(k-1)-v^{(1)}(k)]$$

And has a non-zero mean Gaussian characteristic. Further, assume that, $$CAx_a^{(1)}(k-1)+CBu(k-1)=Cx_a(k)$$

and, absent an attack, $$B_0a_0^{(1)}(k)+B_ca_c^{(1)}(k)=0$$

then $r_3(k)$ is a Gaussian distributed random variable, with covariance $$\Sigma_{r_3}=C\Theta T^TC^TQ^{(1)}C^T\Theta TC+R^{(1)}$$

and sum of squares is $$\mathbb{R}_3(k)=r_3(k)^T\Sigma_{r_3}^{-1}r_3(k)$$

then the compound scalar test hypothesis becomes:

$$H_0: X(\mathbb{R}_3(k))<\text{threshold}$$

$$H_1: X(\mathbb{R}_3(k))>\text{threshold}$$

where $H_1$ signifies a disagreement at time k. In an example, the threshold is 0.99.

These principles or residual normality testing are similarly applicable to disagreement testing of other sensors, such as rotational sensors, altitude tensors, thermometers, etc. Thus truly disparate sensors can be tested for agreement, providing a robust and secure sensing platform for cyber-physical systems.

Returning to the more general case, in an example, the first sensor set and the second sensor set can consist of members of a first type of sensor. Thus, the same type of sensor is compared against each other. Sensor types can classified based on how the physical measurement taken (e.g., current generated in a piezo electric device under mechanical stress). In an example, the sensor type is classified based on the mechanism used to achieve the measurement. In an example, the first sensor set can consist of a first type of sensor and the second sensor set can consist of a second type of sensor. Thus, in this example, the two sensor sets represent different types of sensors that use a different mechanism to arrive at some common measurement. For example, both satellite navigation systems and inertial navigation systems can provide an absolute position of the UAV 105, but each uses a different mechanism to arrive at the position measurement.

The cluster circuit set 160 can perform cluster analysis on the sampled sensor disagreements. As noted above, diversity in sensor number (e.g., the more sensors used), manufacturer (e.g., multiple manufacturers are harder to infiltrate in order to compromise a device), and type (e.g., an inertial navigation system and a barometer to measure altitude have different attack vectors) tend to lead to increased robustness of the system. However, such variety can lead to reduced uniformity in measurement results at any given moment. To address this issue, an analysis of the disagreement signals produced by ascertaining sensor disagreements over time can reduce false positive alerts and provide greater confidence in identifying a malfunctioning sensor.

Normative testing can provide a profile of false disagreements between sensors. For example, suppose the disagreement signal is an exponential distribution with a fixed arrival rate (false disagreement rate). Thus, the disagreement signal will include disagreement indications between the two sensors at fixed intervals. If $X_1$ is the time of the ith false disagreement, then $X_{i-N}-X_i$ is the time between ith false disagreement and the i+N false disagreement. When a sensor deviation occurs, the disagreement indications in the disagreement signal cluster. Thus, the interim arrival rate of the disagreement indications (i.e. $X_{i-N}-X_i$ will tend to be short, or getting shorter over time.

In an example, performing the cluster analysis can include determining whether a predetermined number of disagreements occurred within a calculated period of time. This is effective because the shorter interim arrival times of the disagreement indications increase the number of indications in fixed time windows. In an example, the calculated time period can be calculated via an inverse Gamma function with a probability parameter, a sample-size parameter, and a time-of-arrival parameter, the time-of-arrival parameter determined via measurement of a sensor system during normative testing. For example, for a given probability P, if $X_{i-N}-X_i<T$ a cluster can identified, where $$T=\text{InvGamma}(P,N,1/R)$$

and
N=number of disagreement indications
R=time of arrival of each disagreement indication Consider the values for the given parameters: P=0.05, N=10, and R=rate of false alarms during normative testing, then T=542. Thus, in this scenario, the calculated time period (e.g., time window) in which 10 disagreements is concerning is 542 units.

The alert circuit set 165 can provide a deviation indication in response to the cluster analysis resulting in disagreement density beyond a threshold. As noted above, the cluster analysis provides an indication when the threshold is met, such as a predefined number of disagreement indications within the calculated time period. The deviation indication can be a variety of indications, such as an alarm, a disabling signal for the deviating sensor, initiation of an investigation into the source of the deviation (e.g., determining whether a false signal is manipulating the sensor), a log entry, etc. In an example, the deviation indication can indicate which sensor of the plurality of sensors is the source of the deviation. In an example, a relationship structure, such as a decision tree, can be applied to pairs (or other combinations) of sensors in the plurality of sensors using disagreements in the dataset that provided the deviation indication. That is, time correlated disagreements that resulted in the deviation indication can be compared to determine which sensor disagrees with others while eliminating from consideration those sensors that agree with the others. An example of such a decision tree is described below with respect to FIG. 3.

By applying the components and techniques described herein, the asynchronous nature of system attack and defense in perimeter defense is addressed. Disparate sensors can be used to control a cyber-physical system and misbehaving sensors can be reliably detected and dealt with. Thus, cyber-physical system builders and users can deploy critical systems with greater confidence in the ability of these systems to withstand attacks from malicious entities.

Figure 2A:
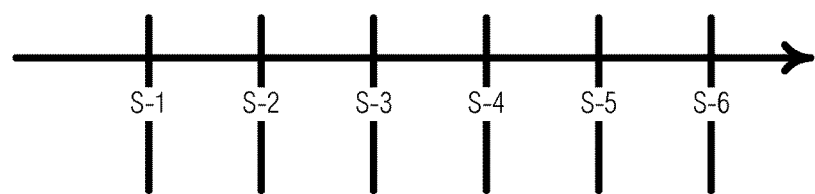
FIGS. 2A and 2B illustrates an example of a disagreement signal cluster analysis timeline, according to an embodiment.
Figure 2B:
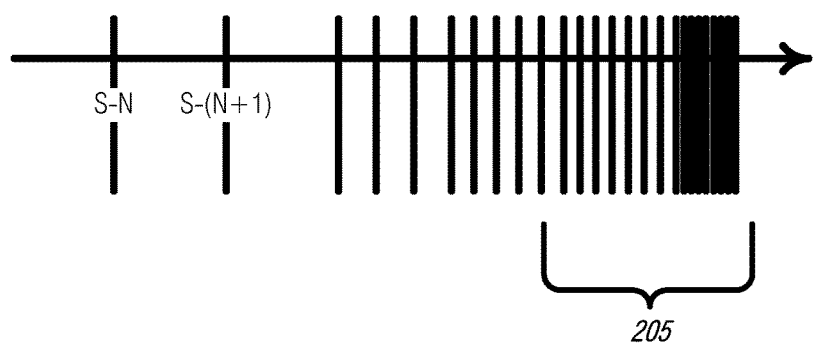

FIGS. 2A and 2B illustrates an example of a disagreement signal cluster analysis timeline 200, according to an embodiment. As described above, during a normative period (e.g., when the system is operating normally and is not under attack) disagreements between two sensors can still occur for a variety of reasons (e.g., differing calibration, error tolerances, measurement mechanism, etc.). FIG. 2A illustrates a normative period of the timeline 200, with disagreement indications S-1 through S-6. Although illustrated having a fixed interim arrival times, varying intervals can also be addressed because a cluster of such indications is not expected to occur during normative operation.

FIG. 2B illustrates a later period in the disagreement signal cluster analysis timeline 200, starting at S-N and moving through S-(N+M). In this portion of the time line, region 205 indicates the calculated time period discussed above. The increased density of the disagreements in the timeline 200 indicates that a deviation is occurring. If the number of disagreements with the time period 205 is greater than the number used to calculate the time period 205 (e.g., 10 as described above), then an alert, or other deviation indication can be produced.

Figure 3:
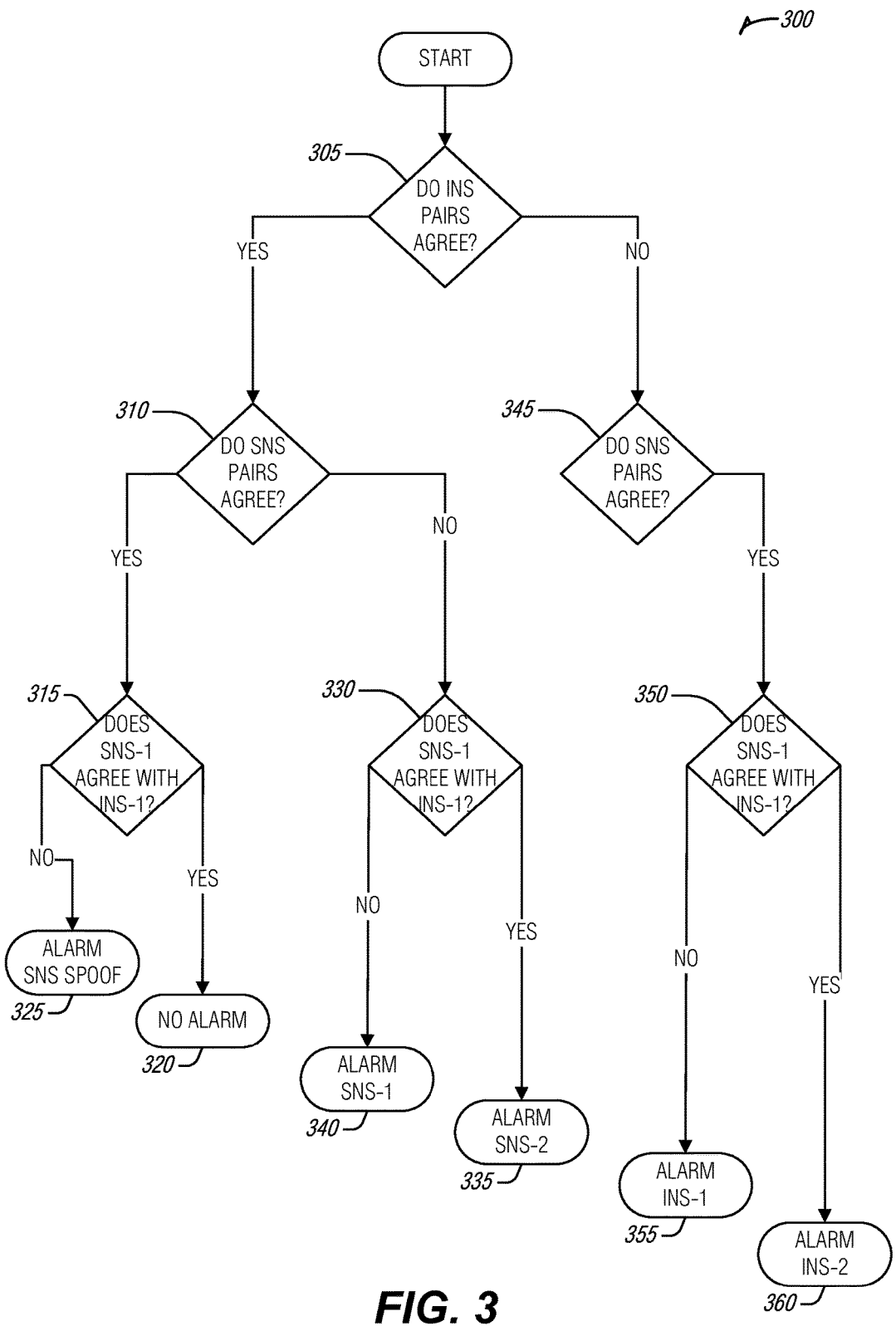
FIG. 3 illustrates an example of a deviating sensor decision tree, according to an embodiment.

FIG. 3 illustrates an example of a deviating sensor decision tree 300, according to an embodiment. As described above, a decision tree, or other mechanism can be used to determine which sensor of a plurality of sensors is causing problems. In the example of the decision tree 300 applies to a system with two inertial navigation system sensors and two satellite navigation system sensors. In an example, the disagreements discussed below are determined after the cluster analysis results in a disagreement indication.

At the decision 305, it is tested whether or not the two inertial navigation system sensors agree with each other (i.e., that they did not disagree). If the two inertial navigation system sensors do agree with each other, then decision 310 determines whether the two satellite navigation system sensors agree with each other. If decision 310 is also affirmative, it can be concluded that the intra type checks indicate that no problem exists. However to address a sensor type attack (e.g., an attack effective across the entire sensor type, such as a global position system spoof attack), the first satellite navigation system sensor is compared to the first inertial navigation system sensor are decision 315. If decision 315 indicates an agreement, then no alarm 320 is imitated. However, if the decision 315 indicates a disagreement, the alarm 325 can be initiated and indicate a spoofing attack on the satellite navigation system sensors.

Moving back to the decision 310, a disagreement between the satellite navigation system sensors where the inertial navigation sensors agree (at decision 305) indicates that one of the satellite navigation sensors is deviating. To determine which of the two satellite navigation sensors is the offending sensor, the first satellite navigation sensor can be tested for agreement with a trusted sensor (e.g., the first inertial navigation sensor) at decision 330. If the first satellite navigation sensor does not agree with the first inertial navigation system sensor, then the alarm 340 can indicate that the first satellite navigation system sensor is the offending sensor. Otherwise, the alarm 335 can indicate that the second navigation system sensor is the offending sensor.

Moving back to the decision 305, if the inertial navigation sensors disagree, one of them is the offending sensor. At the decision 345, the satellite navigation sensors can be tested for agreement. It is noted that if these sensors do not agree, the decision tree cannot make a determination because either of the inertial navigation sensors is an offender and either of the satellite navigation system sensors is an offender, and thus there is no trusted sensor than can be used to determine which of each type of sensor is an offender. However, if the two satellite navigation sensors do agree with each other, each can be considered a trusted sensor—assuming that an attacker could not simultaneously perform a spoof attack and compromise an inertial navigation system sensor—to test the first inertial navigation sensor at decision 350. If the first inertial navigation sensor disagrees with a satellite navigation system sensor, then the alarm 355 can indicate that the first inertial navigation sensor is the offending sensor. Otherwise, alarm 360 can indicate that the second inertial navigation sensor is the offending sensor.

The decision tree 300 performs a trust analyses on some sensors that can then be used to test other sensors. Such relationships can be exploited in other sensor arrangements. Moreover, some sensors may be more impervious to attack, and thus tested first to establish a trusted sensor set early in the process, such as the initial testing of the inertial navigation system sensors at decision 305. In an case, the number of sensors tested can be increased, and the specific order of testing can be varied as long as the final result is determinative of an offending set of sensors.

Figure 4:
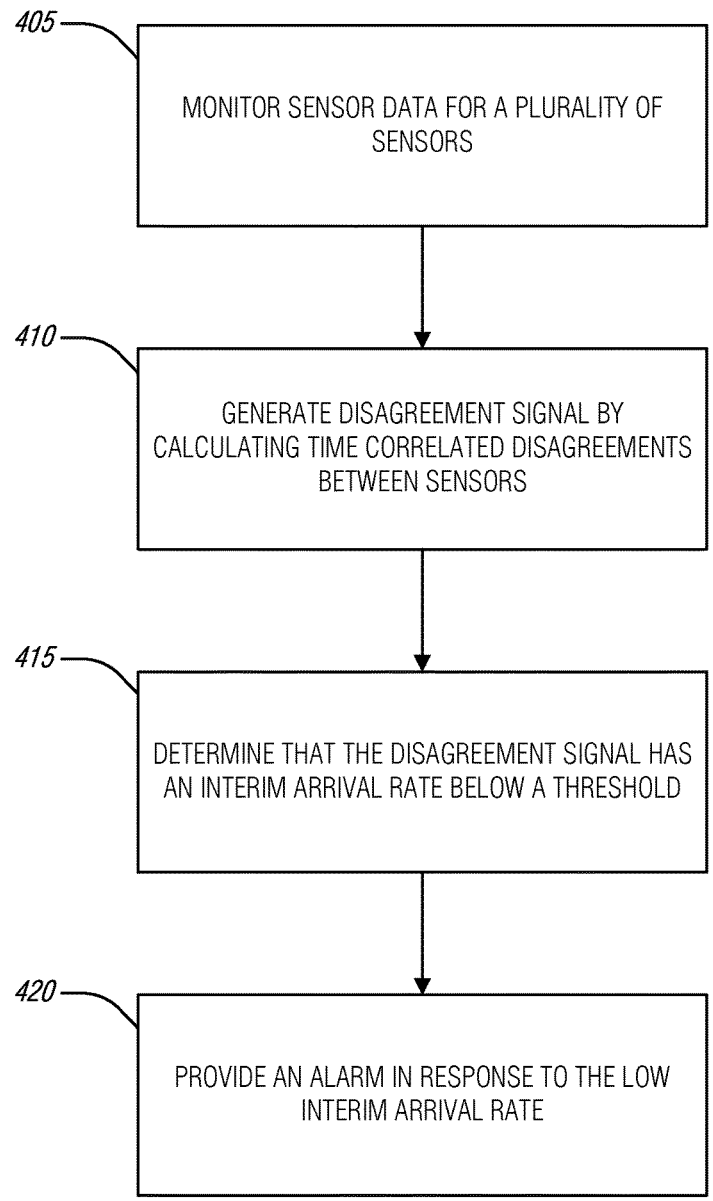
FIG. 4 illustrates an example of a method for cyber-physical defense, according to an embodiment.

FIG. 4 illustrates an example of a method 400 for cyber-physical defense, according to an embodiment. The operations of the method 400 are implemented in computing hardware or carried out via computing hardware instructed by software. Example components are described above with respect to FIG. 1 and below with respect to FIG. 5.

At operation 405, sensor data for plurality of sensors can be monitored. The plurality of sensors can include a first set of sensors (e.g., consisting of a first single type such as satellite navigation systems) with a cardinality greater than one and a second set of sensors (e.g., consisting of a second single type such as inertial navigation systems) also with a cardinality greater than one.

At operation 410, a disagreement signal can be created (e.g., generated) by calculating time correlated disagreements between sensors in the first set of sensors, between sensors in the second set of sensors, and between sensors in the first set of sensors and the second set of sensors. Thus, intra-set disagreements for both sets of sensors as well as inter-set disagreements between the two sets are determined.

Sensor disagreements can be determined via a statistical analysis of a common output by two sensors. In an example, residuals between two sensors can be computed and subjected to the statistical analysis. In an example, normality of the residuals over time can be used to ascertain whether a disagreement exists. In an example, the common output may be derived, such as a position output by an inertial navigation system. In an example, disagreements between sensors of the first set of sensors can be calculated by measuring the normality of the residuals of satellite measurements between two sensors. In an example, disagreements between sensors of the second set of sensors can be calculated by measuring the normality of the residuals of acceleration between two sensors. In an example, disagreements between sensors of the first set of sensors and the second set of sensors can be calculated by measuring the normality of the residuals of position between a sensor in the first set of sensors and a sensor in the second set of sensors.

At operation 415, the disagreement signal can be sampled and a determination that the sampled disagreement signal has an interim arrival rate below a threshold can be made. As noted above, disparate sensors may disagree at times by virtue of differing operating parameters, quality, or other factors. However, when one sensor is being manipulated, the frequency of disagreements rises, resulting in a clustering of disagreements in time (e.g., as illustrated in FIGS. 2A and 2B). In an example, the threshold is a time period with magnitude determined via an inverse Gamma function with a probability parameter, a sample-size parameter, and a time-of-arrival parameter, the time-of-arrival parameter determined via measurement of a sensor system during normative testing. Such a threshold illustrates a period in which disagreement density is beyond that of the system when it is not under attack.

At operation 420, an alarm can be provided in response to determining that the sampled disagreement signal has an interim arrival rate below a threshold. In an example, the alarm can include identification of a sensor in the plurality of sensors deemed to be compromised. As described above with respect to FIGS. 1 and 3, different sensor pairing structures can be used to make this identification. In an example, the sensor is deemed to be compromised when it disagrees with other sensors in the plurality of sensors and the other sensors in the plurality of sensors agree with each other. That is, an identification of a sensor that disagrees with one or more other sensors where those other sensors agree with each other.

Figure 5:
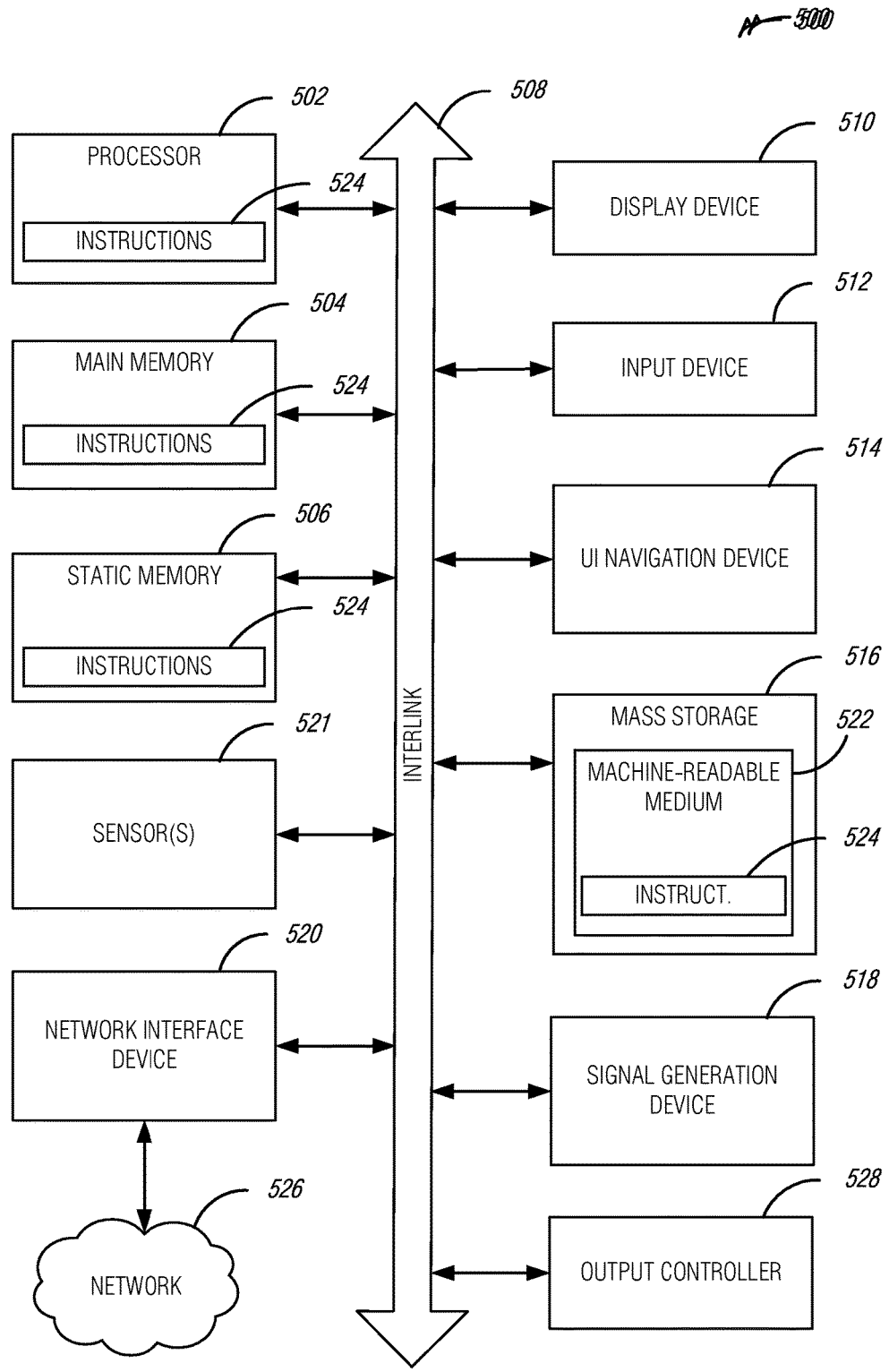
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for cyber-physical system defense, the system comprising:
    a sensor interface to receive sensor data from a plurality of sensors;
    a sampling circuit set to sample sensor disagreements between the plurality of sensors over time;
    a cluster circuit set to perform cluster analysis on the sampled sensor disagreements including the cluster circuit set to perform a cluster analysis algorithm to calculate a time period and determine whether a predetermined number of the sampled sensor disagreements occurred within the calculated time period, wherein the calculated time period is calculated via an inverse Gamma function with a probability parameter, a sample-size parameter, and a time-of-arrival parameter, the time-of-arrival parameter determined via measurement of a sensor system during normative testing; and
    an alert circuit set to provide a deviation indication in response to the cluster analysis resulting in disagreement density beyond a threshold, the deviation indication including an alarm.

2. The system of claim 1, wherein to sample sensor disagreements between the plurality of sensors over time includes the sampling circuit set to:
    obtain a first data set for a first sensor set;
    obtain a second data set for a second sensor set; and
    determine a disagreement between the first data set and the second data set.

3. The system of claim 2, wherein to determine the disagreement between the first data set and the second data set includes the sampling circuit set to:
    combine the first data set with the second data set to create a measurement data set;
    calculate a set of residuals for the measurement data set; and
    determine that a mean for the residuals is beyond a threshold in relation to an expected mean for the residuals.

4. The system of claim 3, wherein the first sensor set and the second sensor set consist of members of a single type of sensor.

5. The system of claim 4, wherein the single type of sensor is a satellite navigation system.

6. The system of claim 5, wherein the set of residuals are differences between respective first satellite navigation system measurements in the first data set and second satellite navigation measurements in the second data set correlated in time.

7. The system of claim 4, wherein the single type of sensor is an inertial navigation system.

8. The system of claim 7, wherein the set of residuals are differences between respective first acceleration measurement in the first data set and second acceleration measurements in the second data set correlated in time.

9. The system of claim 3, wherein the first sensor set consist of members that are inertial navigation systems and the second sensor set consists of members that are satellite navigation systems.

10. The system of claim 9, wherein the set of residuals are differences between respective first position measurements in the first data set and second position measurements in the second data set correlated in time.

11. The system of claim 1, wherein to provide the deviation indication includes the alert circuit set to indicate a sensor from the plurality of sensors that is a source of the deviation.

12. The system of claim 11, wherein to indicate the sensor for the plurality of sensors that is the source of the deviation includes the alert circuit set to apply a decision tree to pairs of sensors in the plurality of sensors using disagreements in a dataset used in providing the deviation indication.

13. A non-transitory machine readable medium including instructions that, when executed by a machine, cause the machine to perform operations comprising:
    sampling sensor disagreements between a plurality of sensors over time;
    performing cluster analysis on sampled sensor disagreements including:
        performing a cluster analysis algorithm to calculate a time period; and
        determining whether a predetermined number of the sampled sensor disagreements occurred within the calculated time period, wherein the calculated time period is calculated via an inverse Gamma function with a probability parameter, a sample-size parameter, and a time-of-arrival parameter, the time-of-arrival parameter determined via measurement of a sensor system during normative testing; and
    providing a deviation indication in response to the cluster analysis resulting in disagreement density beyond a threshold, the deviation indication including an alarm.

14. The machine readable medium of claim 13, wherein sampling sensor disagreements between the plurality of sensors over time includes:
    obtaining a first data set for a first sensor set;
    obtaining a second data set for a second sensor set; and
    determining a disagreement between the first data set and the second data set.

15. The machine readable medium of claim 14, wherein determining the disagreement between the first data set and the second data set includes:
    combining the first data set with the second data set to create a measurement data set;
    calculating a set of residuals for the measurement data set; and
    determining that a mean for the residuals is beyond a threshold in relation to an expected mean for the residuals.

16. The machine readable medium of claim 15, wherein the first sensor set and the second sensor set consist of members of a single type of sensor.

17. The machine readable medium of claim 16, wherein the single type of sensor is a satellite navigation system.

18. The machine readable medium of claim 17, wherein the set of residuals are differences between respective first satellite navigation system measurements in the first data set and second satellite navigation measurements in the second data set correlated in time.

19. The machine readable medium of claim 16, wherein the single type of sensor is an inertial navigation system.

20. The machine readable medium of claim 19, wherein the set of residuals are differences between respective first acceleration measurement in the first data set and second acceleration measurements in the second data set correlated in time.

21. The machine readable medium of claim 15, wherein the first sensor set consist of members that are inertial navigation systems and the second sensor set consists of members that are satellite navigation systems.

22. The machine readable medium of claim 21, wherein the set of residuals are differences between respective first position measurements in the first data set and second position measurements in the second data set correlated in time.

23. The machine readable medium of claim 13, wherein providing the deviation indication includes indicating a sensor from the plurality of sensors that is a source of the deviation.

24. The machine readable medium of claim 23, wherein indicating the sensor for the plurality of sensors that is the source of the deviation includes applying a decision tree to pairs of sensors in the plurality of sensors using disagreements in a dataset used in providing the deviation indication.

25. A method for cyber-physical system defense, the method comprising:
    sampling sensor disagreements between a plurality of sensors over time;
    performing cluster analysis on sampled sensor disagreements including:
        performing a cluster analysis algorithm to calculate a time period; and
        determining whether a predetermined number of the sampled sensor disagreements occurred within the calculated time period, wherein the calculated time period is calculated via an inverse Gamma function with a probability parameter, a sample-size parameter, and a time-of-arrival parameter, the time-of-arrival parameter determined via measurement of a sensor system during normative testing; and
    providing a deviation indication in response to the cluster analysis resulting in disagreement density beyond a threshold, the deviation indication including an alarm.

26. The method of claim 25, wherein sampling sensor disagreements between the plurality of sensors over time includes:
    obtaining a first data set for a first sensor set;
    obtaining a second data set for a second sensor set; and
    determining a disagreement between the first data set and the second data set.

27. The method of claim 26, wherein determining the disagreement between the first data set and the second data set includes:
    combining the first data set with the second data set to create a measurement data set;
    calculating a set of residuals for the measurement data set; and
    determining that a mean for the residuals is beyond a threshold in relation to an expected mean for the residuals.

28. The method of claim 27, wherein the first sensor set and the second sensor set consist of members of a single type of sensor.

29. The method of claim 28, wherein the single type of sensor is a satellite navigation system.

30. The method of claim 29, wherein the set of residuals are differences between respective first satellite navigation system measurements in the first data set and second satellite navigation measurements in the second data set correlated in time.

31. The method of claim 28, wherein the single type of sensor is an inertial navigation system.

32. The method of claim 31, wherein the set of residuals are differences between respective first acceleration measurement in the first data set and second acceleration measurements in the second data set correlated in time.

33. The method of claim 27, wherein the first sensor set consist of members that are inertial navigation systems and the second sensor set consists of members that are satellite navigation systems.

34. The method of claim 33, wherein the set of residuals are differences between respective first position measurements in the first data set and second position measurements in the second data set correlated in time.

35. The method of claim 25, wherein providing the deviation indication includes indicating a sensor from the plurality of sensors that is a source of the deviation.

36. The method of claim 35, wherein indicating the sensor for the plurality of sensors that is the source of the deviation includes applying a decision tree to pairs of sensors in the plurality of sensors using disagreements in a dataset used in providing the deviation indication.

\* \* \* \* \*